Sept. 6, 1932.  R. D. EVANS  1,875,331

VEHICLE WHEEL

Filed Sept. 19, 1928

Inventor
Rhys D. Evans.

Patented Sept. 6, 1932

1,875,331

UNITED STATES PATENT OFFICE

RHYS D. EVANS, OF AKRON, OHIO, ASSIGNOR TO THE GOODYEAR TIRE & RUBBER COMPANY, OF AKRON, OHIO, A CORPORATION OF OHIO

VEHICLE WHEEL

Application filed September 19, 1928. Serial No. 306,925.

This invention relates to vehicle wheel and rim structures and it has particular relation to structures of the above designated character, in which the rims embody endless rings and transversely split members.

An object of the invention is to provide means for securing rims upon wheels in such manner that the pressure of the air in tires mounted on the rims shall be utilized to insure the maintenance of the rims in their operative positions.

Heretofore, one of the disadvantages present in tire carrying rims mounted upon vehicle wheels resided in the fact that occasionally a rim became loosened upon its support during operation of the vehicle. This not only introduced an element of danger, but the rim usually became misaligned with the wheel, thus resulting in rapid wear on the tires.

This invention practically obviates the disadvantages previously mentioned, by utilizing the resiliency caused by the pressure of the air in a tire, to provide a resilient means for firmly retaining the rim upon the wheel at all times. The invention is embodied by a rim having a transversely split member provided with a tire engaging flange at one edge and an inclined seat on its inner periphery adapted to rest on a similarly inclined surface on the wheel. This member interlocks with an endless member having a tire engaging flange opposite the flange on the split member at one side thereof which is capable of lateral movement relative thereto. Securing means positively engaging the endless member also normally engages the split member, thus providing a positive means for securing the rim on the felloe. Since the two members are capable of a small amount of lateral movement away from each other, the pressure within the tire against the flanges retains the split member firmly on the felloe and also retains the endless member against the securing means, regardless of any small spacing that subsequently may develop between the split member and the securing means.

For a better understanding of the invention, reference may now be had to the accompanying drawing, forming a part of the specification, of which;

Figure 1:
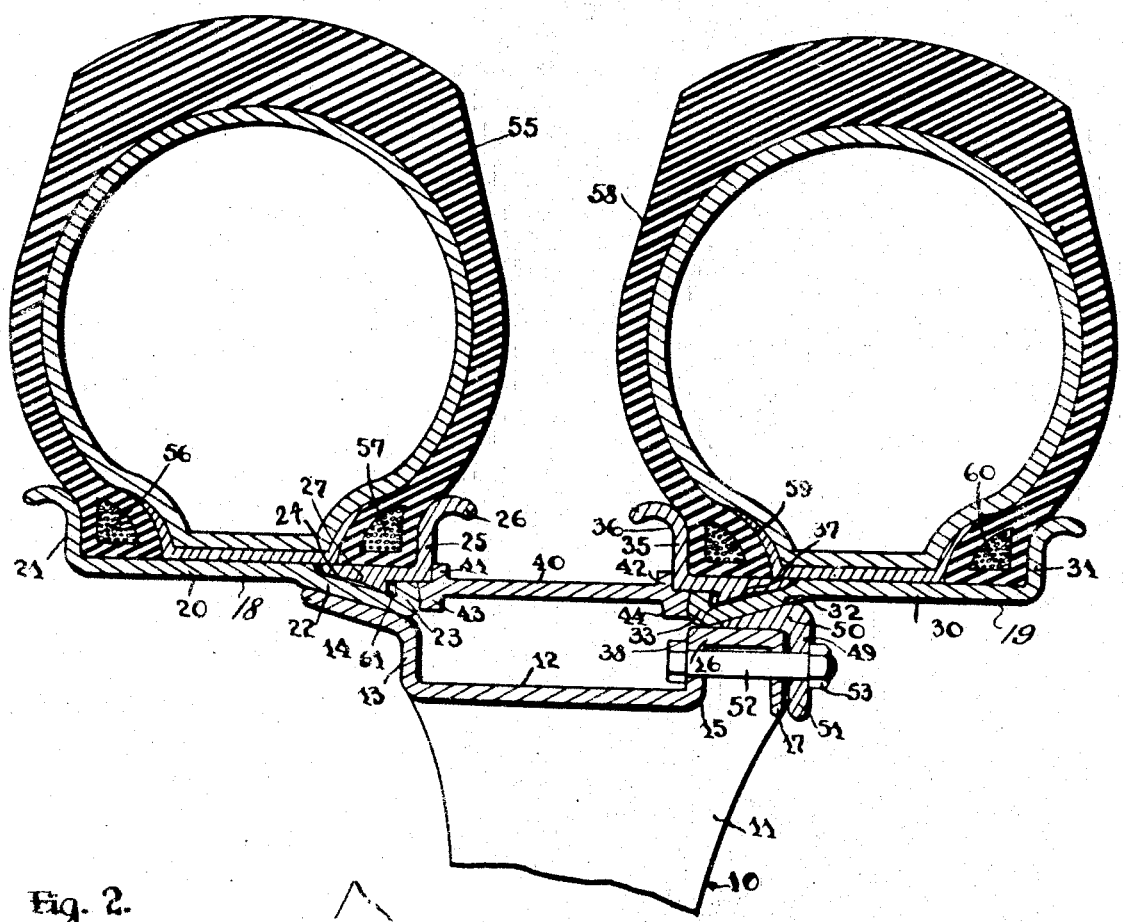
Figure 1 is a cross-sectional view according to one embodiment of the invention of a dual wheel structure having a pair of rims supported thereon.

Referring to Figure 1, a wheel 10 is composed of a plurality of spokes 11 merging at their inner ends into a hub (not shown), and at their outer ends into an annular substantially channel-shaped felloe 12. A radially extending flange 13 comprising a side portion of the felloe 12 terminates in an inclined portion 14, whereas a similar radially extending flange 15 comprising the opposite side portion thereof, merges with a horizontal outwardly extending portion 16, which terminates in an inwardly disposed radially extending flange 17. The inclined portion 14 of the flange 13 supports a correspondingly inclined portion 22 of a transversely split member 20 comprising a portion of a rim 18. A tire engaging flange 21 projects from the edge of the member 20 opposite the portion 22. A flange 23, projecting outwardly from the edge of the portion 22, opposite the flange 21, defines an annular recess 24 in the split member 20.

Figure 2:
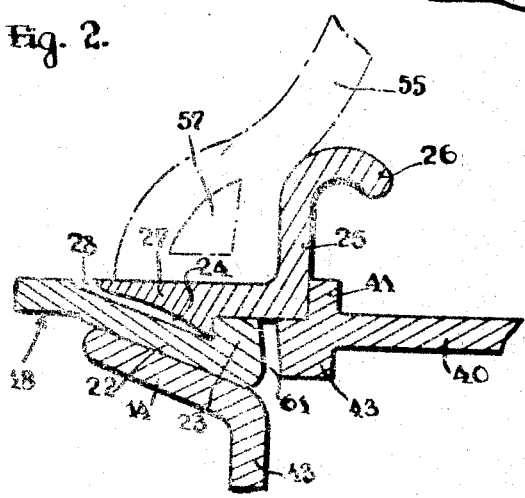
Figure 2 is a fragmentary cross-sectional view of the inner rim illustrated in Figure 1, showing the relation of the endless ring and the transversely split member before application of the clamping devices employed for securing the rims on the wheel.

The recess 24 is adapted to receive a substantially complementary protrusion 27 formed adjacent the inner edge of an endless ring 25 which thus is disposed in interlocking relation to the member 20. A tire engaging flange 26, similar to the tire engaging flange 21, but disposed oppositely thereto, is formed at the outer edge of the ring 25. As best shown by Figure 2, the protrusion 27 and the recess 24 are constructed, as indicated at 28, to permit a limited amount of relative lateral movement between them.

On the opposite side of the felloe 12, above the horizontal portion 16, a second rim 19 is mounted which is identical with the rim 18, but disposed in reverse relation thereto. The rim 19 is composed of a transversely split member 30 having a tire retaining flange 31 on one edge and an inclined portion 32 at the other that terminates in a substantially radially disposed outwardly extending flange 33, thus defining an annular recess 38. An endless ring 35, provided with a tire retaining flange 36 disposed at one edge is provided with an annular projection 37, at the opposite edge, which is similar to the projection 27 on the rim 18, and which likewise is disposed in the recess 38 of the split member 30. Like the rim 18, the endless ring 35 and the transversely split member 30 of the rim 19 are loosely disposed in interlocking relation, as indicated also at 28 (Figure 2), thus permitting a small amount of relative lateral movement.

An annualar spacing member 40 is provided between the rims 18 and 19, which has circumferentially extending ribs 41 and 42 projecting radially outwardly adjacent the opposite edges thereof, and other radially extending ribs 43 and 44 on its inner surface having their outer radially extending edges disposed farther apart than the outer radial extending edges on the ribs 41 and 42, respectively. When the spacing ring is in its operative position, the ribs 41 and 42 engage the endless rings 25 and 35, respectively, whereas the ribs 43 and 44 are disposed therebeneath in position to be abutted by the flanges 23 and 33 of the split members 20 and 30, respectively.

As shown by Figure 2, when the spacing ring and rims are being assembled, a space 61 is present between the ribs 43 and 44, and the flanges 23 and 33 of the split members 20 and 30, respectively, which space is slightly less than the spaces 28 between the endless rings and the transversely split members. Consequently, when the endless rings and the transversely split members are moved toward each other, the space 61 is closed before the space 28.

In order to secure the rims in their proper positions, a clamping ring 49 is provided which has a wedging portion 50 adapted to project between the tapered portion 32 of the transversely split member 30 and the horizontal portion 16 of the felloe. The ring 49 also is provided with a radially disposed, inwardly extending flange 51 adapted to be adjustably secured to the flanges 15 and 17 of the felloe by bolts 52. These bolts are provided with heads on their inner ends which engage the flange 15, and on their outer ends with nuts 53 which engage the flange 51 of the clamping ring 49.

The rim 18 supports a tire 55 having beads 56 and 57 which abut the flanges 21 and 26 of the split member 20 and the endless ring 25, respectively. Similarly, the rim 19 supports a tire 58 mounted thereon having bead portions 59 and 60 that abut the tire engaging flanges 31 and 36 of the split member 30 and the endless ring 35, respectively. When the tires are inflated, the endless rings and the transversely split members of the rims 18 and 19, respectively, are distended in a manner, as shown by Figure 2. When the nuts 53 are tightened and a wedging portion 50 of the clamping ring 49 is forced against the tapered portion 32 of the split member 30, the rims are wedged upon their support and simultaneously the endless rings and split members are moved to their positions shown by Figure 1. During such operation, the inclined portion 22 on the rim 18 is firmly wedged against the inclined portion 14 of the flange 13 and the inclined portion 32 on the transversely split member 30 is firmly engaged by the wedging portion 50 of the clamping ring 49.

Frequently, during the operation of the wheel, certain parts of the structure become loosened relatively because of the stretching and distortioning of parts of the metallic structure, which is accentuated by shocks received when the wheel passes over obstructions. For example, the inner tapered portion 22 of the rim 18 may be distortioned and moved to a higher position upon the tapered support 14 of the felloe, one or more of the nuts 53 may become loosened, or the bolts may become lengthened owing to the tension thereon. When a loosening of the parts occurs in this manner, the air pressure in the tires immediately forces the tire engaging flanges thereof sufficiently far apart to compensate therefor.

Figure 3:
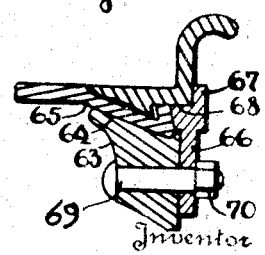
Figure 3 is a fragmentary cross-sectional view, showing the application of the invention on a wheel adapted to support a single rim.

According to Figure 3, illustrating an embodiment of the invention as applied to a single rim supporting wheel, a wheel 63 is provided with a single bevel 64 on its periphery that supports a rim 65 in the same manner in which the rim 18 is supported in the construction shown by Figure 1. Clamps 66, (or any suitable clamping ring), having projections 67 and 68 at their outer ends adapted to engage the endless ring of the rim, are adjustably secured to the wheel by bolts 69 projecting through the clamps 66 and the wheel 63, and engaged operatively by nuts 70. When the nuts are tightened, the tire retaining flanges are moved toward each other in the same manner as has previously been described. Hence, when any play occurs between the parts, the flanges immediately compensate for it as hereinbefore described.

From the foregoing description, it is apparent that a wheel construction has been provided in which the air pressure within the tires mounted thereon is utilized to insure maintenance of the rims firmly on the felloe, regardless of any looseness that may occur subsequently to the initial mounting of the rims on the wheel. It is apparent also that the construction has great utility during the operation of the wheels over rough surfaces for extended periods of time when certain parts of ordinary wheel structures frequently become loosened.

Although I have illustrated only the preferred forms which the invention may assume and have described those forms in detail, it will be apparent to those skilled in the art that the invention is not so limited, but that various modifications may be made therein without departing from the spirit of the invention or from the scope of the appended claims.

What I claim is:

1. The combination of a wheel having a tapered peripheral surface, a rim embodying a pair of annular members movable laterally relatively, each embodying a tire retaining flange, one of such members having a tapered surface on its inner periphery, complementary to the surface on the wheel and adapted to rest thereon, the latter member also having a shoulder on its inner periphery and adjacent the other rim member, and adjustable clamping means engaging the wheel and such other rim member initially to force the rim members toward each other against the pressure in a tire on the rim, and finally to engage such shoulder on the other rim, whereby any looseness subsequently occurring between the parts will be taken up by the air pressure in the tire forcing the rim members away from each other.

2. The combination with a dual tired wheel structure having a felloe provided with a tapered supporting surface adjacent its inboard edge, of a rim embodying a pair of annular members normally movable relatively laterally a limited amount, a pneumatic tire on the rim, each of said annular members embodying a tire engaging flange, one of such members having a tapered seating surface resting upon the tapered surface of the felloe, a second rim mounted adjacent the outboard edge of the felloe, clamping means for moving such second rim toward the first rim, and spacing means between and in contact with the second rim and the member of the first rim not having the tapered seating surface, the pneumatic tire mounted on the first rim tending to hold the members forming the rim apart so that the member having the tapered seating surface will be forced on the inboard felloe seat inasmuch as the other rim member is fixed in position by the spacing means.

3. The combination with a dual rimmed, felloed wheel structure having on the periphery of its felloe a tapered supporting surface, a member having a tapered surface removably mounted on the wheel felloe in spaced relation from the first named surface, the smaller diameters of such surfaces being adjacent, of a pair of rims adapted to mount pneumatic tires said rims being each composed of two annular members normally movable laterally with respect to each other, each rim member embodying a tire retaining flange, one member of each rim being disposed on one of the tapered supports on the wheel respectively, the other rim members being disposed adjacent each other, and spacing means separating such last mentioned members, the arrangement of parts being such that air under pressure in the pneumatic tires tends to move the laterally movable members of each rim apart which holds the tapered members of each rim on the wheel seats inasmuch as the adjacent members of the rims are fixed by the spacing means.

4. The combination with a wheel structure having a felloe, of a pair of rims adapted to receive pneumatic tires, each of which is composed of a pair of annular members, said members each having a tire engaging flange thereon such members of each pair normally being movable laterally with respect to each other, means on the felloe for supporting one member of each rim, and spacing means between and in contact with the remaining rim members, whereby the air under pressure in the pneumatic tires may force the first mentioned member of each rim into contact with the felloe supporting means, the spacing means preventing movement of the remaining members.

In witness whereof, I have hereunto signed my name.

Signed at Akron, in the county of Summit and State of Ohio, U. S. A., this 14th day of September, 1928.

RHYS D. EVANS.